Aug. 24, 1937.  W. A. RUSH  2,090,986
TRAVELING BAG FOR AUTOMOBILES
Original Filed April 4, 1931  2 Sheets-Sheet 1
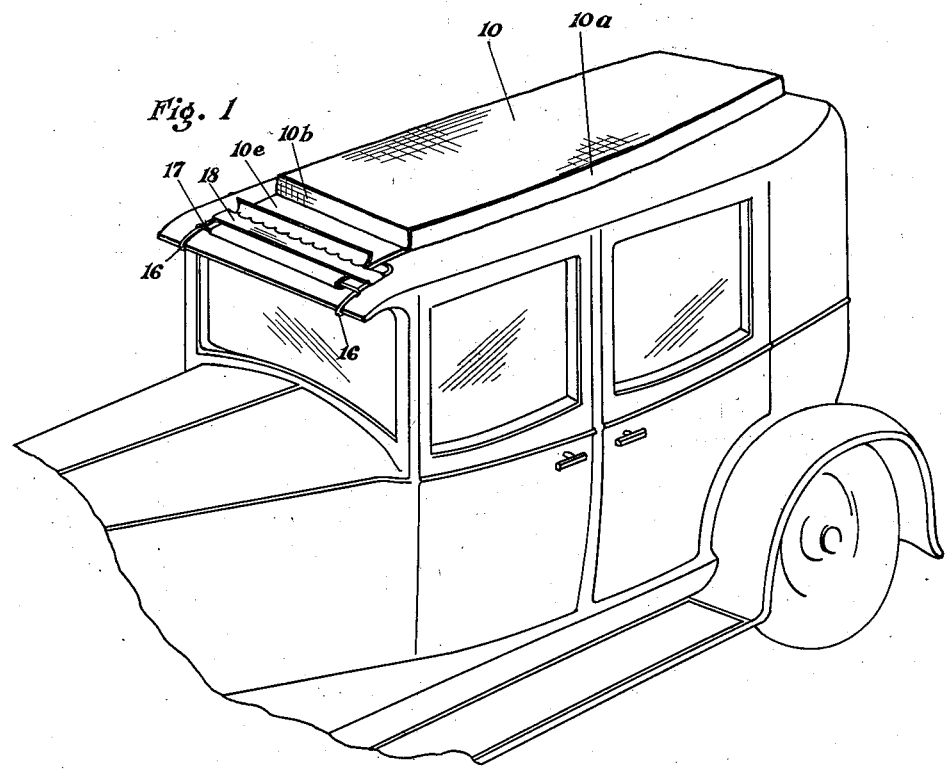
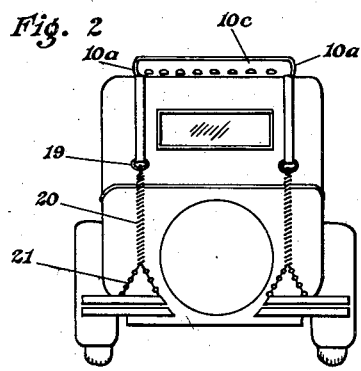
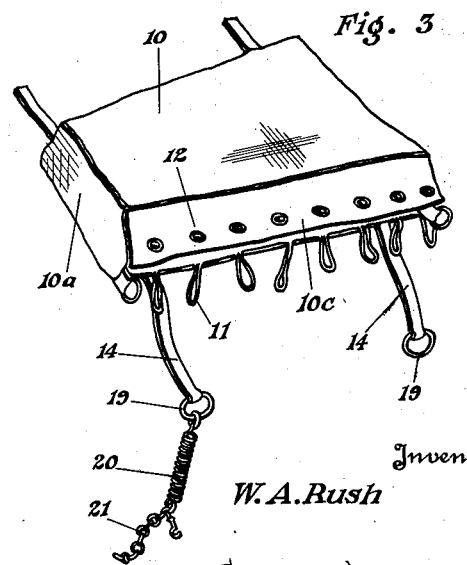
Inventor
W. A. Rush
By Emil F. Lange
Attorney

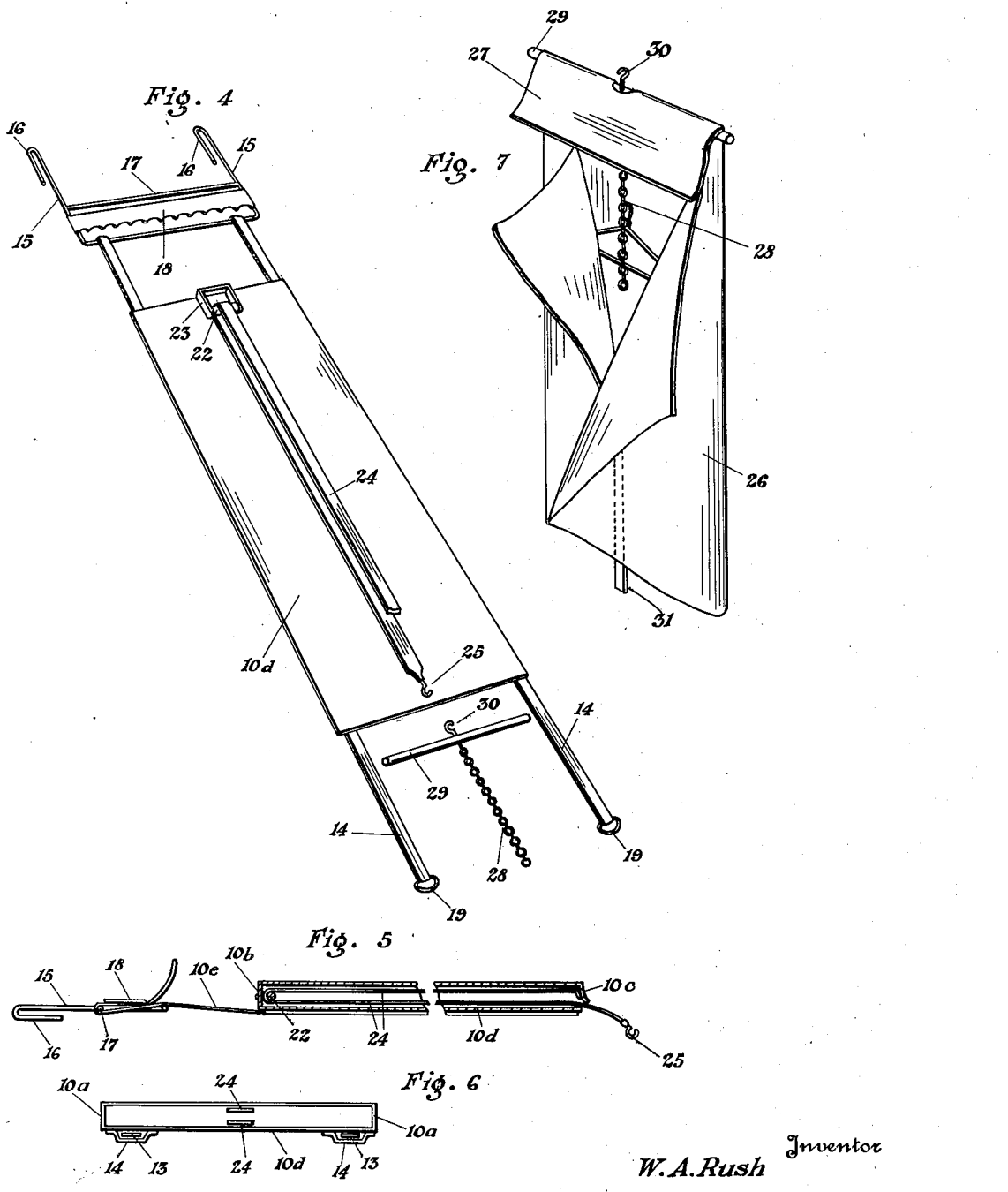

Patented Aug. 24, 1937

2,090,986

UNITED STATES PATENT OFFICE 2,090,986

TRAVELING BAG FOR AUTOMOBILES

Weaver A. Rush, Beatrice, Nebr.

Application April 4, 1931, Serial No. 527,739
Renewed February 13, 1936

3 Claims. (Cl. 224—29)

My invention relates to traveling bags, its primary object being the provision of a traveling bag for the storage of articles of wearing apparel on automobile trips.

Another object of the invention is the provision of a bag adapted to receive articles of wearing apparel and to maintain them free from wrinkles and protected from dust and moisture.

Another of my objects is the provision of a traveling bag together with means for securing the traveling bag to the roof of an automobile where it is entirely out of the way of the occupants of the automobile.

Another of my objects is the provision of a traveling bag with elastic tension devices for maintaining the bag in taut condition to prevent its being dislodged by the wind.

Another object of the invention is the provision of a bag and fastening devices which are adjustable to fit an automobile roof of any of the usual lengths.

It is also my object to provide a bag which may be attached to the roof of an automobile and which is convenient of access so that the articles of wearing apparel may be inserted into or withdrawn from the bag with the utmost convenience.

Having in view these objects and others which will be pointed out in the following description, I will now refer to the drawings, in which Figure 1 is a view in perspective of a portion of an automobile with my traveling bag secured thereto.

Figure 2 is a view in rear elevation of an automobile with my traveling bag, the view showing particularly the securing devices between the rear end portion of the traveling bag and the automobile.

Figure 3 is a perspective view of a fragment of the rear end portion of the traveling bag.

Figure 4 is a view in perspective of the traveling bag and its connections, the top, side and end walls of the bag being omitted in order to show the mechanism for inserting the articles of wearing apparel.

Figure 5 is a broken view in longitudinal section of my traveling bag and its connections.

Figure 6 is a transverse sectional view of my traveling bag.

Figure 7 is a view in perspective of a dustproof bag for surrounding the articles of wearing apparel, the dustproof bag being insertable into the traveling bag.

The traveling bag itself is indicated by the general reference character 10. This bag is in box form including side walls 10a, a front wall 10b, a hinged rear wall 10c, and a bottom 10d as well as the top. This bag may be made of any preferred material such as canvas, leather, oilcloth, sheet rubber, or the like. The material itself should be more or less waterproof and the seams at the edges should also be so made as to prevent the entrance of moisture. The only opening to the bag is at the rear and this is closed by means of the rear wall 10c which is hinged at its upper edge to the bag. The rear opening of the bag should be closed during travel and for this purpose any suitable closing device may be employed. In my Figure 3 I show loops 11 which cooperate with eyes 12 for latching the rear wall 10c in closed position but it is obvious that numerous other fastening devices may be employed in the place of loops 11 and the eyes 12. As shown in Figure 6, the bottom 10d of the bag is provided with a pair of slides 13. These slides extend preferably the full length of the bag but in certain conditions these slides may be slightly modified to adapt the bag for use on coupes and roadsters and other similar automobiles. The slides 13 receive the straps 14 so that the bag is adjustable lengthwise on the straps 14 by sliding it in one direction or the other.

The front fastening device for the bag includes a U-shaped member having two forwardly projecting arms 15 of which the forward extremities 16 are also U-shaped. The arms 15 are braced by means of a transverse bar 17 and also by means of a latching plate 18, the parts 17 and 18 having additional functions in their relations to the bag as will be subsequently described. The forward extremities of the straps 14 are rigidly secured to the rear transverse portion of the U-shaped support of which the arms 15 are a part, this being best shown in Figure 4.

Loops or rings 19 are secured to the straps 14 at their rear extremities. Each of the rings 19 carries a tension spring 20 having a length of loose chain 21 secured thereto. This loose chain may be secured at its free ends to the rear bumper or bumperettes of the automobile so as to maintain the straps 14 under the tension of the springs 20. The relative position of the parts is such that the chains 21 may be secured to any fixed part at the rear of the automobile as, for example, the support for the spare tire. The hooks 16 are designed for engaging over the edge of the visor of the automobile.

From the foregoing description it will be seen that the straps 14 are maintained in taut condition above the roof of the automobile and that the bag itself is slidably adjustable in a forward and rearward direction to fit the particular automobile to which it is applied. Means are also provided for latching the traveling bag in its adjusted position. Referring now to Figures 1 and 4, it will be seen that the bottom 10d of the bag projects forwardly to form a flap 10e. This flap passes over the rear transverse portion of the U-shaped member of which the arms 15 are a part, then under the latching plate 18, then around the brace 17, and finally back under the latching plate 18. This latching plate 18 is serrated on its rear edge to grip the flap 10e so as to prevent slipping. This construction prevents the rearward sliding of the traveling bag 10.

In order to adapt the bag for use on roadsters and coupes, the slides 13 are provided with openings midway between the ends of the bag and the straps 14 are then threaded through the forward portions of the slides 13. The bag may then be folded over in its middle so that its rear end will be contiguous to its forward end and so that the two may be fastened together. In the case of automobiles with short roofs the rear portion of the bag will hang down over the rear of the automobile when the articles of wearing apparel are inserted or removed but the bag will be entirely above the roof of the automobile during driving.

Means are also provided for the insertion and removal of the wearing apparel through the rear opening of the traveling bag. These means include a pulley 22 which is journalled in a U-shaped support 23 which is firmly secured inside the traveling bag to the front wall 10b. The strap 24 is trained over the pulley 22 in the manner shown in Figure 4. One end of the strap, preferably the one on the lower run, is provided with a snap fastener or a hook 25 for engaging the support for the wearing apparel. It is obvious that a pull rearwardly on the upper run of the strap 24 will pull the hook 25 toward the front end of the bag 10. Likewise tension on the lower run of the strap 24 will cause the upper run of the strap to approach the forward end of the bag.

For facilitating the insertion of the wearing apparel into the bag 10 and for further protecting the wearing apparel, I provide a second bag 26 as best shown in Figure 7. This bag also may be made of any desired material, preference being given to a dustproof material of sufficient rigidity and toughness to maintain its form and to thus protect the apparel stored within. A paper material of the proper stiffness and toughness will answer the purpose admirably but it is obvious that a fabric like canvas or an oilcloth may be used in the place of paper. This bag has two overlapping side flaps as shown in Figure 7 and it is also provided with an upper flap 27 so that the bag 26 may be closed at all edges except the bottom. The apparel itself is secured in the usual manner to the usual coat and other garment hangers which in turn may be hooked on to a chain 28 on the transverse bar 29. The links of the chain are so designed as to engage the hooks of the garment hangers. The chain itself may be folded over into loop form so that the hangers may engage the loop of the folded chain. The bar 29 is further provided with a hook 30 so that the wearing apparel may be hung on a hook in the closet of the hotel or similar place when stopping for the night. In this manner the wearing apparel may be treated as a unit until it is desired to use one or more articles. The bag 26 is further provided with one or more straps 31 for a use to be subsequently described.

When starting on an automobile trip the apparel is first secured to the hangers in common use for supporting wearing apparel. These hangers are then all secured to the chain 28 which with its bar 29 is then inserted in the bag 26. After the flaps of the bag 26 are all folded down the hook 30 is brought into engagement with the hook 25 and the free end of the strap 24 is then engaged and pulled out. This movement draws the bag 26 and its contents into the traveling bag 10 after which the fastening device for the rear wall 10c is closed. When stopping on the trip it is only necessary to open the rear closed end of the traveling bag 10 and to pull on the strap 31 in order to withdraw the bag 26 and its contents from the traveling bag. The bag 26 and its contents may then be carried into the hotel by grasping the hook 30. Access to the wearing apparel may easily be obtained by unfolding the flaps of the bag 26 and withdrawing the bar 29 with the wearing apparel which is attached to the chain 28. The particular articles needed may be removed without disturbing the other articles which may be hung from a hook in the closet either with the bag 26 surrounding them or without. When the trip is then resumed it is only necessary to again insert the bag 26 with its contents by means of the mechanism shown in Figure 4.

Having thus described my invention in such full, clear, and exact terms that its construction and operation will be readily understood by others skilled in the art to which it pertains, what I claim as new and desire to secure by Letters Patent of the United States is:

1. In combination with the roof of an automobile, a bag in box-like form secured lengthwise thereto and conforming to the general dimensions of the roof of the automobile, said bag having narrow and collapsible side walls and a rigid front wall and having a full opening at its rear extremity, a pulley within said bag in the forward portion thereof, a flexible element trained over said pulley, a chain detachably connectible with said flexible member, said chain having a plurality of detachable connections for articles of wearing apparel, a flap closure projecting rearwardly from the top wall of said bag and adapted for closing the opening, and means at the rear lower edge of said bag for securing said closure at the free edge thereof to the bottom wall of said bag.

2. In combination with a roof of an automobile, a bag in box-like form secured lengthwise thereto and conforming to the general dimensions of the roof of the automobile, the rear wall of said bag being a rearward extension of the top wall thereof and being adapted to function as a hinged closure for the opening, a second bag shaped and dimensioned to slide into said first bag through the rear opening thereof, a pulley in the forward portion of said first named bag, a strap trained over said pulley, a detachably engaging member secured at one extremity of said strap, and a chain detachably secured to said second bag, said chain being adapted to engage said engaging member and having a plurality of links for the attachment of articles of wearing apparel within said second bag.

3. In combination with the roof of an automobile, a bag in box-like form secured lengthwise thereto and conforming to the general dimensions of the roof of the automobile, the rear wall of said bag being a rearward extension of the top wall thereof and being adapted to function as a hinged closure for the opening, a second bag shaped and dimensioned to slide into said first bag through the rear opening thereof, a folded flap at the forward edge of said second bag, a transverse bar loosely seated in the fold of said flap and having a hook at substantially its median point, the folded edge of said flap being provided with an opening for the passage therethrough of said hook, a pulley in the forward portion of said first named bag, a strap trained over said pulley, said strap terminating in means for detachably engaging said hook, and a chain secured to said bar for the attachment of a plurality of garments.

WEAVER A. RUSH.